(12) United States Patent
Noa (10) Patent No.: US 11,586,570 B2
(45) Date of Patent: Feb. 21, 2023

(54) DUAL MODE CARRIAGE SYSTEM TRANSLATION

(71) Applicant: Eagle Technology, LLC, Melbourne, FL (US)

(72) Inventor: David Noa, North Amityville, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 881 days.

(21) Appl. No.: 16/257,764

(22) Filed: Jan. 25, 2019

(65) Prior Publication Data
US 2020/0242061 A1 Jul. 30, 2020

(51) Int. Cl.
| | |
|---|---|
| G06F 13/38 | (2006.01) |
| B64D 7/00 | (2006.01) |
| G06F 13/16 | (2006.01) |
| G06F 13/40 | (2006.01) |
| G06F 13/10 | (2006.01) |

(52) U.S. Cl.
CPC ............ *G06F 13/387* (2013.01); *B64D 7/00* (2013.01); *G06F 13/102* (2013.01); *G06F 13/16* (2013.01); *G06F 13/4068* (2013.01)

(58) Field of Classification Search
CPC ....... B64D 7/00; G06F 13/387; G06F 13/102; G06F 13/16; G06F 13/4068
See application file for complete search history.

(56) References Cited

U.S. PATENT DOCUMENTS

| | | | | |
|---|---|---|---|---|
| 7,137,599 | B1 * | 11/2006 | Sitzmann | B64D 7/08 244/137.4 |
| 7,802,048 | B2 * | 9/2010 | Campbell | F41F 3/06 701/3 |
| 8,967,032 | B2 * | 3/2015 | Campbell | F42C 17/04 703/4 |
| 9,875,200 | B2 * | 1/2018 | Huber | G06F 13/16 |
| 9,916,277 | B2 * | 3/2018 | Hammel | G06F 13/4282 |
| 10,122,833 | B2 * | 11/2018 | Hammel | G06F 13/4027 |

(Continued)

OTHER PUBLICATIONS

"Development of a Standard Interface For a New Generation of Miniature Stores"—by LT Jeff Barnaby and Dr. Russ Duren; Digital Avionics Systems Conference, 1999; 7 Pages (Year: 1999).*

(Continued)

*Primary Examiner* — Brian T Misiura
(74) *Attorney, Agent, or Firm* — Edell, Shapiro & Finnan, LLC (57) ABSTRACT

A carriage system on an aircraft determines the type of each store attached to the carriage system. The carriage system detects stores attached to the carriage system and determines whether a first interlock signal formatted according to a first interface format is present for each store. If the first interlock signal is present, then the dual mode carriage system determines that a store interface for the store is the first interface format. If the first interlock signal is not present for the store, the carriage system determines whether a second interlock signal formatted according to a second interface format is present on a predetermined set of connection pins of the first interface format. If the second interlock signal is present, then the carriage system determines that the store interface for the store is the second interface format. The carriage system reports the store interface of each store to the aircraft.

20 Claims, 6 Drawing Sheets

(56) References Cited

U.S. PATENT DOCUMENTS

| | | | |
|---|---|---|---|
| 10,422,615 B2* | 9/2019 | Huber | F42C 17/00 |
| 2015/0089099 A1 | 3/2015 | Huber et al. | |
| 2019/0260159 A1* | 8/2019 | Eveker | H01R 27/02 |
| 2020/0072587 A1* | 3/2020 | Bailey | B64D 7/08 |

OTHER PUBLICATIONS

"Safety, Software Architecture and MIL-STD-1760"—by Matthew John Squair; Published May 1, 2007 (Year: 2007).*
MIL-STD-1760D (2003): Interface Standard for Aircraft/Store Electrical Interconnection System (AEIS), US Dept. of Defense, pp. 1-187.

* cited by examiner

DUAL MODE CARRIAGE SYSTEM TRANSLATION

GOVERNMENT LICENSE RIGHTS

This invention was made with government support under N00019-17-C-0029 awarded by the Department of Defense. The government has certain rights in the invention.

BACKGROUND OF THE INVENTION

Smart weapons deployed on aircraft platforms communicate with the aircraft platform through a standardized interface to ensure interoperability. The MIL-STD-1760 format was developed as the first smart weapon interface standard, but other standards have subsequently been developed. For instance, the AS5725 interface standard was developed to accommodate smart miniature munitions. The AS5725 interface standard may be implemented as either a Miniature Mission Store Interface (MMSI) or a Joint Miniature Munitions Interface (JMMI). The MIL-STD-1760 and AS5725 standards are similar, but have different electrical connections that use different form factors and different signals.

To expand the capacity of an aircraft platform, the aircraft may mount carriage systems that carry two or more weapons at a single station of the aircraft. Typically, carriage systems may carry either MIL-STD-1760-based weapons or AS5725-based weapons, but not both. Due to the different form factors and signals in the two different interface standards, carriage systems do not carry both types of weapons.

SUMMARY OF THE INVENTION

The present disclosure is directed toward a method for determining the type of store attached to a dual mode carriage system. The method includes detecting a store attached to the dual mode carriage system on an aircraft platform. The method also includes determining whether a first interlock signal formatted according to a first interface format is present for the store. If the first interlock signal is present, then the dual mode carriage system determines that a store interface for the store is the first interface format. Responsive to a determination that the first interlock signal is not present for the store, the method comprises determining whether a second interlock signal formatted according to a second interface format is present on a predetermined set of connection pins of the first interface format. If the second interlock signal is present, then the dual mode carriage system determines that the store interface for the store is the second interface format. The method also includes reporting the store interface of the store to the aircraft platform.

The present disclosure is further directed to a dual mode carriage system comprising a carriage store interface, a plurality of carriage store station interfaces, and at least one mode switching module. The carriage station interface is configured to communicate with an aircraft platform based on a first interface format. The plurality of carriage store station interfaces is configured to communicate with a corresponding plurality of stores. Each carriage store station interface is associated with a corresponding one or more hooks to physically connect a corresponding store to the dual mode carriage system. Each carriage store station interface is configured according to the first interface format. The mode switching module is configured to detect whether the hooks associated with a particular carriage store station interface are closed. The mode switching module is also configured to set an operating mode for the particular carriage store station interface to the first interface format after detecting a first interlock signal formatted according to the first interface format. Responsive to a determination that the first interlock signal is not present for the particular carriage store station interface, the mode switching module is configured to determine whether a second interlock signal formatted according to a second interface format is present on a predetermined set of connection pins of the particular carriage store station interface. If the second interlock signal is present, then the mode switching module is further configured to set the operating mode for the particular carriage store station interface to the second interface format.

In addition, the present disclosure is also directed to a method of taking an inventory of stores attached to a dual mode carriage system. The method comprises powering the dual mode carriage system connected to a plurality of stores. The method also includes independently determining an operating method corresponding to each of the plurality of stores. The method further comprises generating an inventory of the plurality of stores connected to the dual mode carriage system by communicating with each store based on the corresponding operating mode. The method also comprises reporting the inventory to an aircraft platform connected to the dual mode carriage system.

BRIEF DESCRIPTION OF THE DRAWINGS

Like reference numerals have been used to identify like elements throughout this disclosure.

DETAILED DESCRIPTION OF THE INVENTION

The techniques presented herein provide support for a weapons platform using two different interface formats (e.g., MIL-STD-1760 and AS5725) through a connector for one of the interface formats (e.g., a MIL-STD-1760 connector). These techniques provide the flexibility of a dual mode carriage system that can support both types of weapons (e.g., weapons that use the MIL-STD-1760 interface format and weapons that use the AS5725 format).

In one example, the dual mode carriage system makes use of the six remote terminal address lines in the MIL-STD-1760 interface format, which are not required in the AS5725 interface format. The dual mode carriage system switches AS5725 signals (e.g., a digital data bus) on the address lines of the MIL-STD-1760 interface format when AS5725 stores are carried on the dual mode carriage system. The dual mode carriage system detects which type of store is attached and commands the appropriate switching action.

Figure 1:
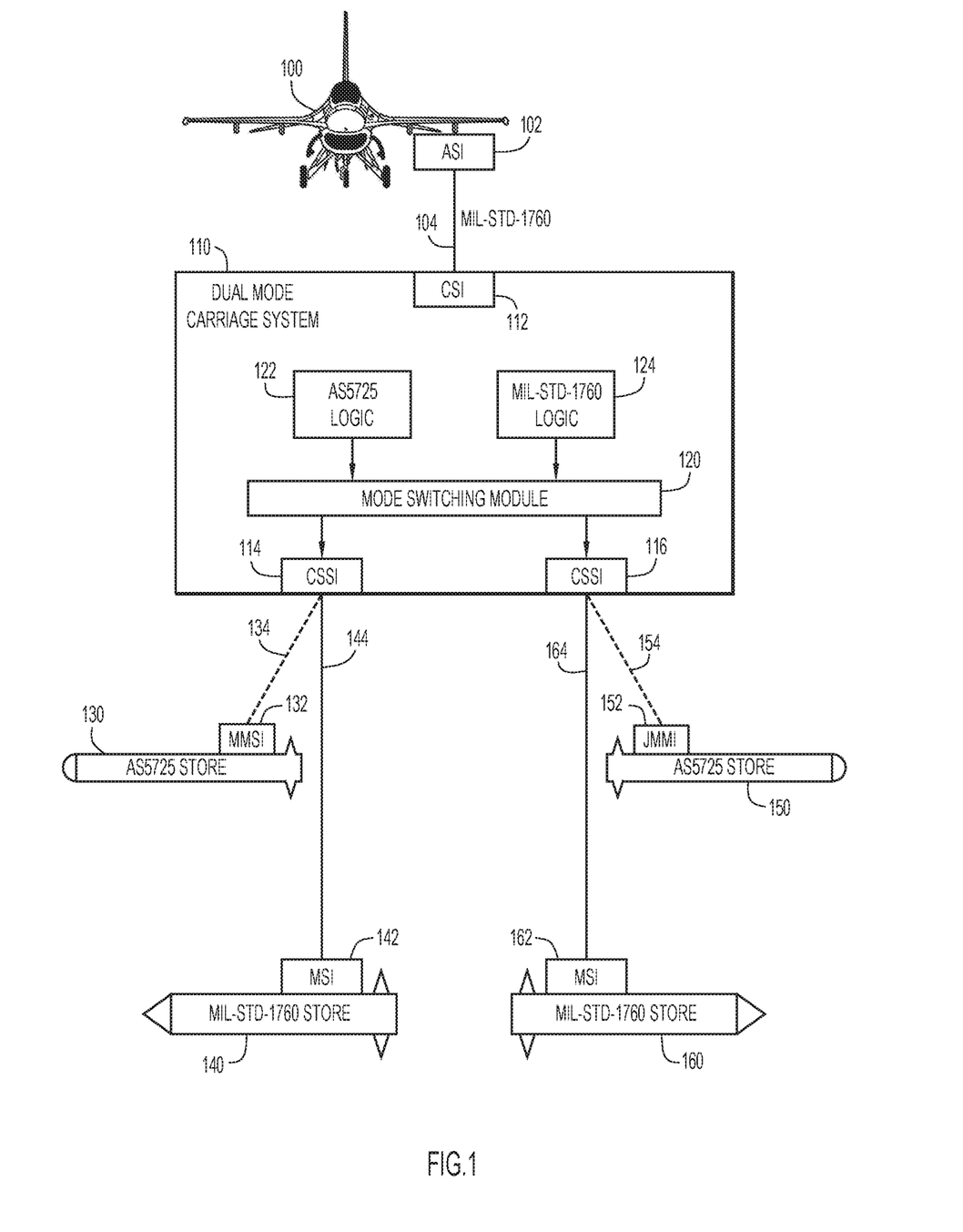
FIG. 1 is a simplified block diagram of an aircraft platform with a dual mode carriage system according to an example embodiment of the present disclosure.

Referring now to FIG. 1, a simplified block diagram shows an aircraft platform 100 with an Aircraft Station Interface (ASI) 102 connected by a cable 104 (e.g., a MIL-STD-1760 umbilical cable) to a dual mode carriage system 110. The dual mode carriage system 110 includes a Carriage Station Interface (CSI) 112 that connects to the ASI 102 via the cable 104. The dual mode carriage system 110 also includes a Carriage Store Station Interface (CSSI) 114 and a CSSI 116. Mode switching module 120 is programmed to configure each of the CSSI 114 and/or CSSI 116 with either AS5725 logic 122 or MIL-STD-1760 logic 124. In other words, the mode switching module 120 selects an operating mode for each CSSI to communicate with the store that is attached to that CSSI.

The CSSI 114 may be connected to an AS5725 store 130 with a Miniature Munitions Store Interface (MMSI) 132 via a cable 134. Alternatively, the CSSI 114 may be connected to a MIL-STD-1760 store 140 with a Mission Store Interface (MSI) 142 via a cable 144. Similarly, the CSSI 116 may be connected to an AS5725 store 150 with a Joint Miniature Munitions Interface (JMMI) 152 via a cable 154. Alternatively, the CSSI 116 may be connected to a MIL-STD-1760 store 160 with an MSI 162 via a cable 164.

In one example, the stores 130, 140, 150, and/or 160 are physically attached to the dual mode carriage system 110 by one or more hooks that may be remotely opened (e.g., by the operator of the aircraft 100) to release the store. The dual mode carriage system 110 may also include logic to monitor the status of the hooks to determine whether a store is currently attached to a particular mounting point associated with a CSSI.

While the dual mode carriage system 110 depicted in FIG. 1 includes two CSSIs 114 and 116, the mode selection techniques described herein may be used for a dual mode carriage system that carry more than two stores (i.e., with more than two CSSIs). Additionally, the specific interface formats (i.e., MIL-STD-1760 and AS5725) are used only as examples, and a carriage system may include other interface standards with the same techniques.

Figure 2:
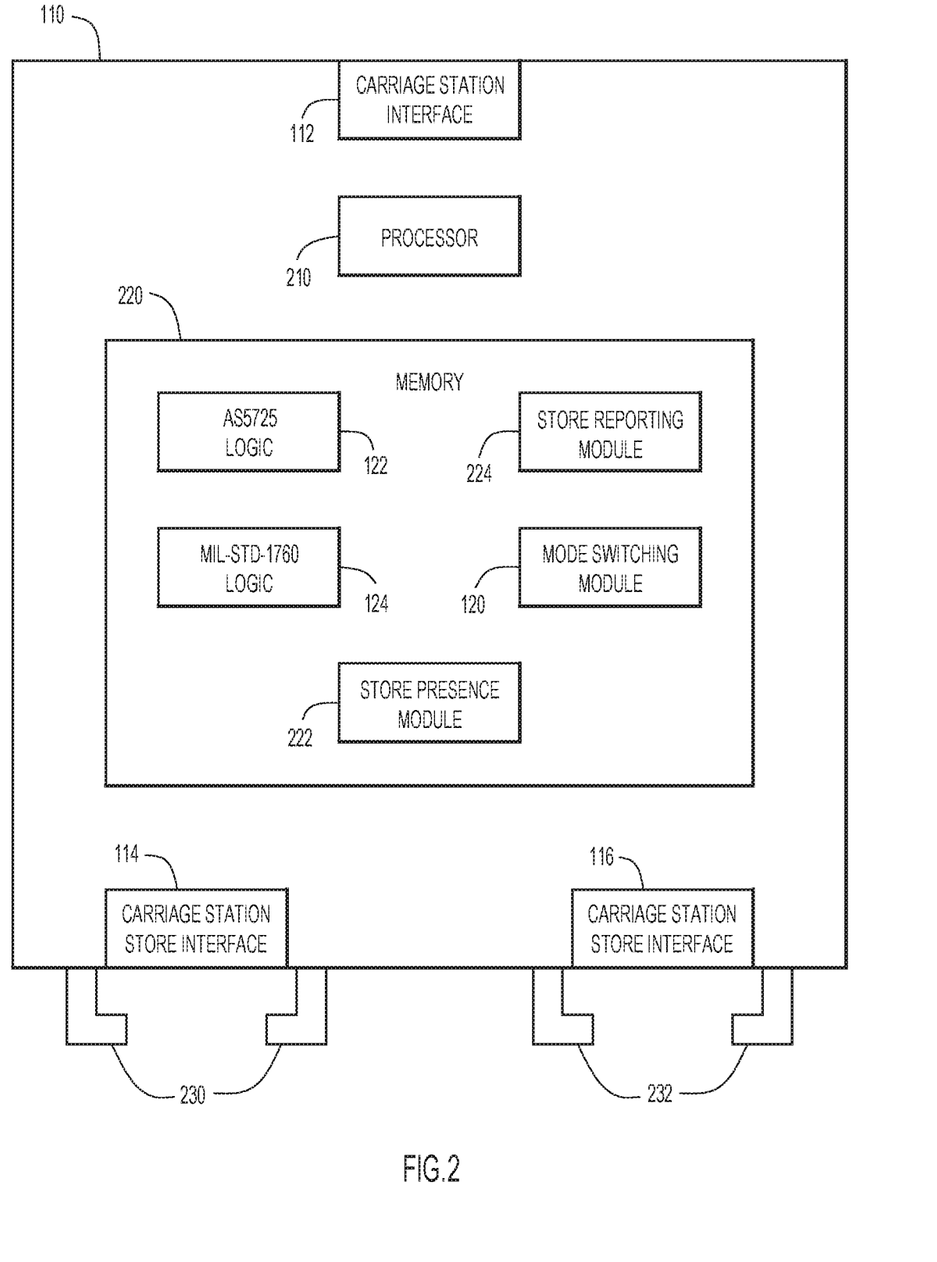
FIG. 2 is a simplified block diagram of a dual mode carriage system according to an example embodiment of the present disclosure.

Referring now to FIG. 2, a simplified block diagram illustrates components of the dual mode carriage system 110. In addition to the CSI 112, CSSI 114 and CSSI 116 described with respect to FIG. 1, the dual mode carriage system includes, among other possible components, a processor 210, a memory 220, and hooks 230 and 232. The processor 210 processes instructions relevant to controlling stores attached to the dual mode carriage system. The memory 220 stores a variety of data and software instructions (e.g., AS5725 logic 122, MIL-STD-1760 logic 124, mode switching module 120, store presence module 222, store reporting module 224, etc.). In one example, the store presence module 222 detects the presence of stores attached to the dual mode carriage system by monitoring the state of hooks 230 and 232. The store reporting module 224 may cause the processor to take an inventory of the stores attached to the dual mode carriage system 110 and reports the inventory to the aircraft via the CSI 112.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, one or more microprocessors or microcontrollers that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

Figure 3:
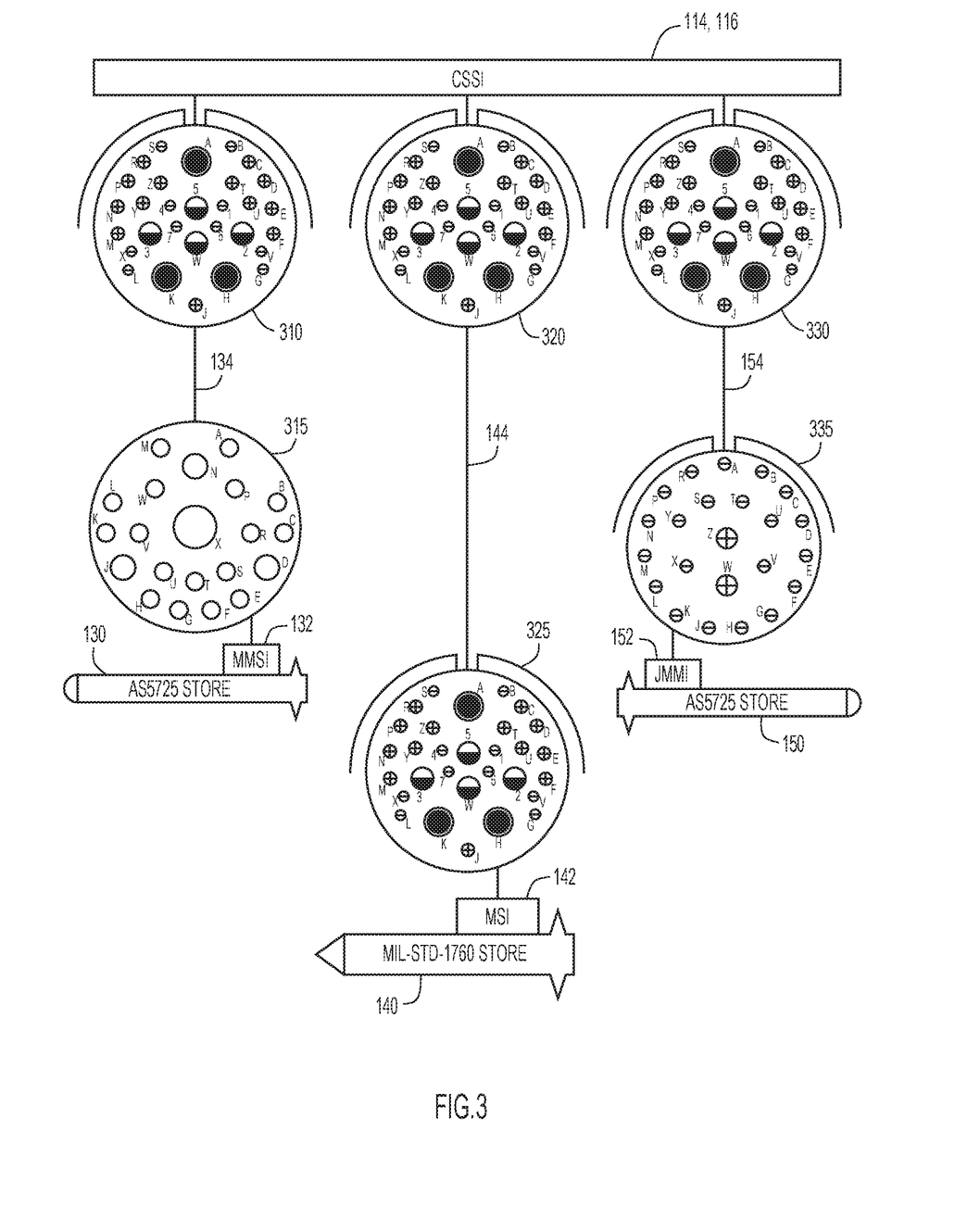
FIG. 3 illustrates the physical cables used to attach different types of smart weapon stores to a dual mode carriage system according to an example embodiment of the present disclosure.

Referring now to FIG. 3, a diagram illustrates the end connectors of the physical cables 134, 144, and 154 that may be used to communicate between the dual mode carriage system and different types of stores. The cable 134 connects the CSSI 114 of the dual mode carriage system 110 to the MMSI 132 of the store 130. The cable 134 connects to the CSSI 114 via a first end 310 with connections pins configured according to the MIL-STD-1760 interface format. The cable 134 connects to the MMSI 132 via a second end 315 with connection pins configured according to the MMSI interface format, which is a class of the AS5725 interface format.

Similarly, the cable 144 connects the CSSI 114 of the dual mode carriage system 110 to the MSI 142 of the store 140. The cable 144 connects to the CSSI 114 via a first end 320 with connections pins configured according to the MIL-STD-1760 interface format. The cable 144 connects to the MSI 132 via a second end 325 with connection pins also configured according to the MIL-STD-1760 interface format.

Additionally, the cable 154 connects the CSSI 116 of the dual mode carriage system 110 to the JMMI 152 of the store 150. The cable 154 connects to the CSSI 116 via a first end 330 with connections pins configured according to the MIL-STD-1760 interface format. The cable 154 connects to the JMMI 152 via a second end 335 with connection pins configured according to the JMMI interface format, which is a class of the AS5725 interface format.

Due to the mismatched interface formats at different ends of some of the cables, (e.g., the first end 310 and the second end 315), connection pin labels from one standard may not directly correlate to the same label in a different standard. For instance the pins labeled C, D, F, and E in the MIL-STD-1760 first end 310 may be connected within the cable 134 to the pins labeled N, D, V, and K, respectively, in the MMSI standard second end 315. Since these pins are typically used for the same purpose in both interface standards (e.g., Direct Current (DC) electrical power), the expected electrical signals are sent and received over the wire connecting the two pins.

The MIL-STD-1760 interface format uses a set of specific pins (e.g., pins L, X, 7, 4, V, G, and 6) as address pins to ensure that commands are addressed to the appropriate store. However, the AS5725 interface format implements a separate interlock signal and digital data bus to communicate with the appropriate store. To carry the AS5725 format-specific signals (e.g., the interlock and data bus signals) to the CSSI 114, which is configured according to the MIL-STD-1760 interface format, the cable 134 repurposes the address pins that are unused in the AS5725 format. In other words, the connection pins F, G, U, S, C, and T, of the second end 315 are connected to the address pins L, X, 7, 4, V, and G, respectively, of the first end 310. Similarly, the connection pins V, U, Y, S, and X on the second end 335 of the cable 154 are connected to the address pins L, X, 7, 4, and V, respectively, on the first end 330 of the cable 154. One example of pin label correspondences is described in Table 1.

TABLE 1

Inter-format pin connections

| MIL-STD-1760 (Class II) | | AS5725-MMSI (Class II) | | AS5725-JMMI | | |
|---|---|---|---|---|---|---|
| Pin | Name | Pin | Name | Pin | Name | Category |
| C | 28 V DC1 | N | Oper_PWR | G | Oper_PWR | DC Power |
| D | 28 V DC1 RTN | D | Oper_PWR_RTN | F | Oper_PWR_RTN | |
| F | 28 V DC2 | V | Safety_EN_PWR | J | Safety_EN_PWR | |
| E | 28 V DC2 RTN | K | Safety_EN_PWR_RTN | K | Safety_EN_PWR_RTN | |
| T | STRUCT_GND | J | STRUCT_GND | H | STRUCT_GND | Structure Ground |
| B | Interlock | | | | | 1760 |
| S | Interlock_RTN | | | | | Interlock |
| 1 | REL_CON | R | Safety-EN-Discr | L | Safety-EN-Discr | Discrete |
| L | A0 | F | Carriage Mated | V | Mated STATUS_L | 1760- |
| X | A1 | G | Store Mated | U | Mated STATUS_H | Addressing/ |
| 7 | A2 | U | DIG_DATA1_H | Y | DIG_DATA1_H | AS5725- |
| 4 | A3 | S | DIG_DATA1_L | S | DIG_DATA1_L | Interlock/ |
| V | A4 | C | DIG_DATA1_SHLD | X | DIG_DATA1_SHLD | Data Bus |
| G | A Parity | T | Platform Class | | | |
| 6 | A_RTN | | | | | |

With different cables 134, 144, 154 having different pin connections on the second ends 315, 325, 335, connecting the stores to the appropriate cable is merely a matter of a technician finding which of the second ends 315, 325, 335 fits on each store. Since the cables 134, 144, 154 are all pre-wired, the technician does not require any expertise in determining the type of store (e.g., MIL-STD-1760, MMSI, JMMI).

Figure 4:
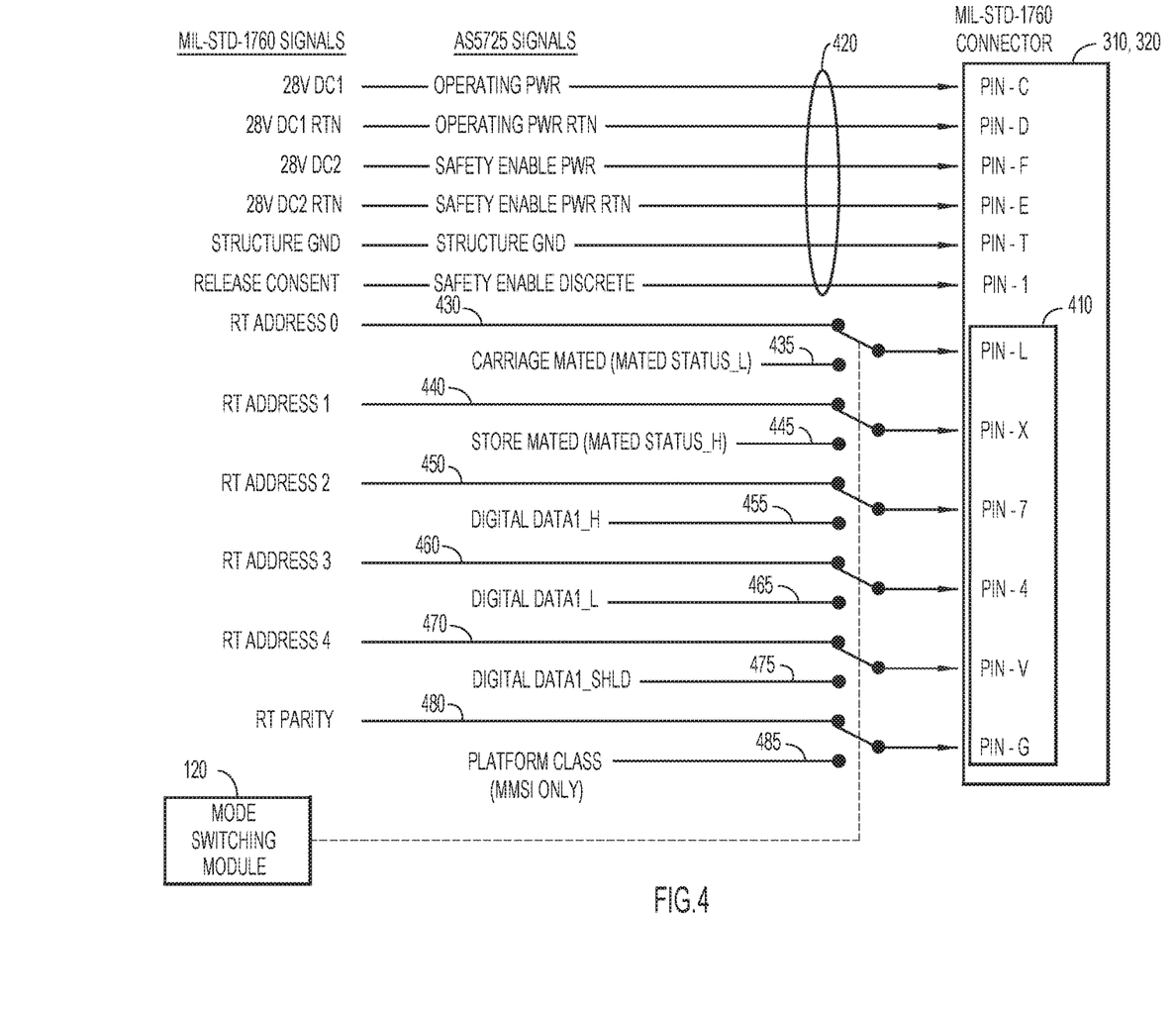
FIG. 4 illustrates the signals carried on connection pins of a MIL-STD-1760 interface connector based on the interface mode according to an example embodiment of the present disclosure.

Referring now to FIG. 4, a signal diagram illustrates which signals are sent to specific pins of a MIL-STD-1760 connector, such as first ends 310, 320, or 330, depending on which type of store is attached to the other end of the cable. Within the MIL-STD-1760 connector (e.g., first end 310) a predetermined set 410 of the connection pins are used as addressing pins, which may be repurposed based on the type of cable used to communicate with the store. The signals 420 received at pins C, D, F, E, T, and 1 are essentially the same independent of whether a MIL-STD-1760-type store is attached or an AS5725-type store is attached. The signals 420 are standard power and safety signals that serve essentially the same purpose across most interface format standards.

The mode switching module 120 varies the signals carried on the address pins 410 of the MIL-STD-1760 connector, depending on the operating mode of the store that is sending/receiving the signals. Pin L in the MIL-STD-1760 connector carries a signal 430 with an address bit (e.g., A0) of the address of a MIL-STD-1760-based store. For an AS5725-based store, pin L carries a signal 435 associated with an interlock signal (e.g., Carriage Mated or Mated Status L). Similarly, pin X carries a signal 440 with a second address bit (e.g., A1) for a MIL-STD-1760-based store, but carries a signal 445 with an interlock signal (e.g., Store Mated or Mated Status H) for an AS5725-based store.

Pin 7 carries a signal 450 with a third address bit (e.g., A2) for a MIL-STD-1760-based store, but carries a signal 455 with a data bus signal (e.g., Digital Data1_H) for an AS5725-based store. Pin 4 carries a signal 460 with a fourth address bit (e.g., A3) for a MIL-STD-1760-based store, but carries a signal 465 with another data bus signal (e.g., Digital Data1_L) for an AS5725-based store. Pin V carries a signal 470 with a fifth address bit (e.g., A4) for a MIL-STD-1760-based store, but carries a signal 475 with still another data bus signal (e.g., Digital Data1_SHLD) for an AS5725-based store. Pin G carries a signal 480 with an address parity bit (e.g., a High parity bit for an odd number of High address bits) for a MIL-STD-1760-based store, but carries a signal 485 with a platform class signal for an MMSI AS5725-based store. Since the platform class signal is not defined for a JMMI AS5725-based store, the pin G is left unconnected when attached to a store with a JMMI interface.

Figure 5:
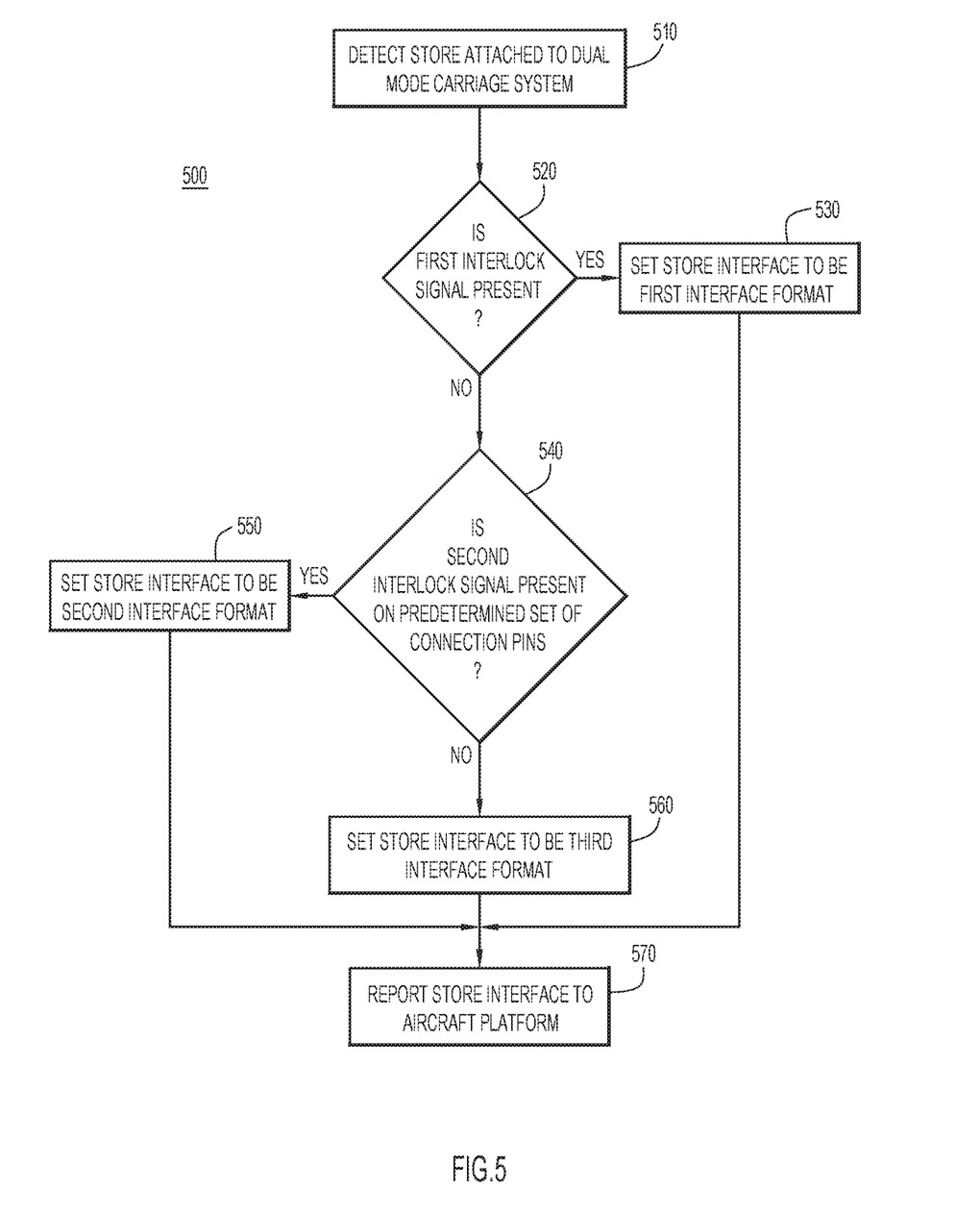
FIG. 5 illustrates steps performed by a dual mode carriage system according to an example embodiment of the present disclosure.

Referring to FIG. 5, a flowchart illustrating operations performed by a carriage system (e.g., dual mode carriage system 110) in a process 500 to determine the appropriate interface for a store attached to the carriage system, according to the techniques described herein. At 510, a carriage system on an aircraft platform detects an attached store. In one example, the carriage system may detect that one or more hooks, which secure the store to the carriage system, are closed. At 520, the carriage system determines whether a first interlock signal, which is formatted according to a first interface format, is present for the store. In one example, the first interface format may be the MIL-STD-1760 format, and the interlock signal may be detected on pins B and S of a MIL-STD-1760 connector associated with the store. If the first interlock signal is present, then the carriage system sets the store interface for that store to be the first interface format at 530. In other words, if the carriage system detects a MIL-STD-1760 interlock signal, then the carriage system determines that the associated store is a MIL-STD-1760 store.

If the carriage system does not detect the first interlock signal, then the carriage system determines whether a second interlock signal formatted according to a second interface format is present on a predetermined set of connection pins of the first interface format at 540. In one example, when the carriage system fails to detect a MIL-STD-1760 interlock signal, then the carriage system tries to detect an AS5725 interlock signal (e.g., carriage/store mated) on pins L and X of the MIL-STD-1760 connector. If the second interlock signal is detected, then the carriage system sets the store interface for that store to be the second interface format at 550. In other words, when the carriage system does not detect a MIL-STD-1760 interlock signal, but does detect an AS5725 interlock signal on a predetermined set of pins, then the carriage system determines that the associated store is an AS5725 store.

If the carriage system does not detect the second interlock signal at step 540, then the carriage system may set the store interface to be a third interface format at 560. In one example, if the carriage system does not detect either a MIL-STD-1760 interlock signal or an AS5725 interlock signal, then the carriage system treats the associated as a "dumb" weapon. Once the store interface of the store has been set, the carriage system reports the store interface to the aircraft platform at 570. In one example, the carriage system may report additional information about the store (e.g., specific type of weapon, status of the weapon store, etc.) to the aircraft platform.

Figure 6:
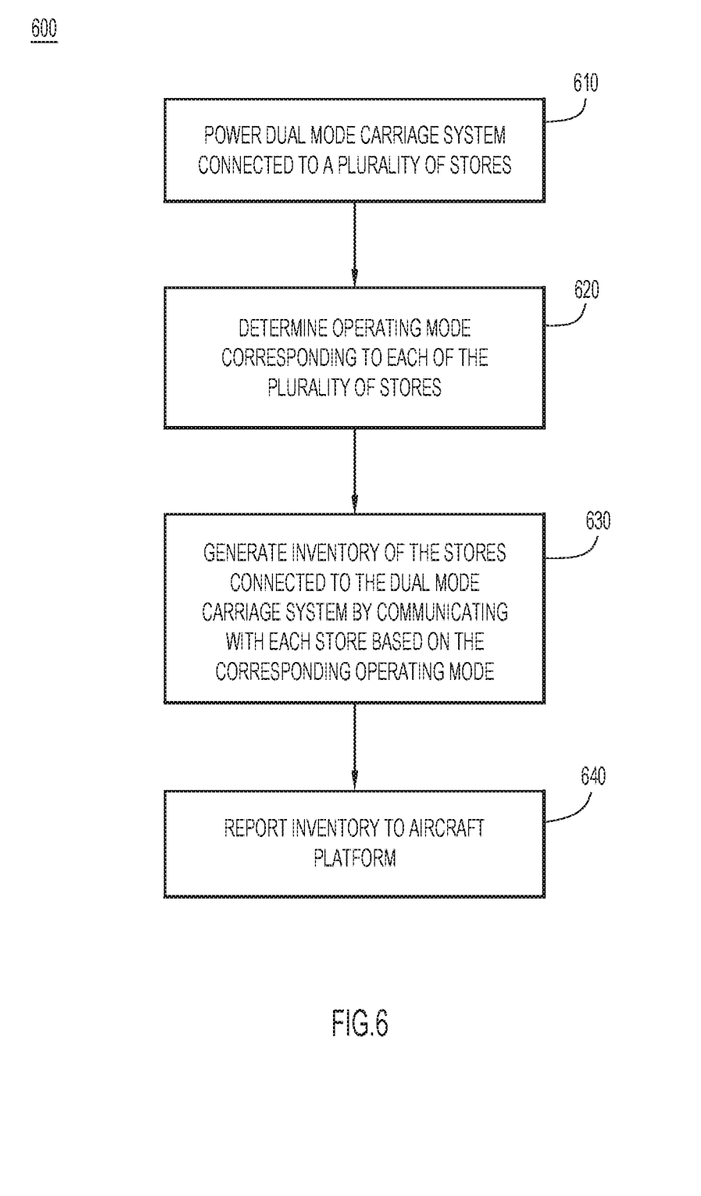
FIG. 6 illustrates steps performed by a dual mode carriage system according to another example embodiment of the present disclosure.

Referring to FIG. 6, a flowchart illustrating operations performed by a dual mode carriage system (e.g., dual mode carriage system 110) in a process 600 to provide an inventory of attached stores to an aircraft platform (e.g., aircraft 100), according to the techniques described herein. At 610, a dual mode carriage system connected to a plurality of stores powers up. In one example, powering up the dual mode carriage system may include providing electrical power from an aircraft platform to the dual mode carriage system. The dual mode carriage system may be powered up while the aircraft is on the ground (e.g., to test the systems) or while in flight (e.g., in preparation to use one or more of the stores).

At 620, the dual mode carriage system independently determines an operating mode corresponding to each of the plurality of stores. In one example, the dual mode carriage system may select between a MIL-STD-1760 operating mode and an AS5725 operating mode for each store based on detecting interlock signals formatted according to one of the interface standards. For instance, the dual mode carriage store may determine that the operating mode for a particular store is a MIL-STD-1760 mode if the dual mode carriage system detects a MIL-STD-1760 interlock signal. Additionally, the dual mode carriage system may determine that the operating mode for another store is an AS5725 mode if the dual mode carriage system does not detect a MIL-STD-1760 interlock signal, but does detect an AS5725 interlock signal on a predetermined set of connections pins of the MIL-STD-1760 connector. In another example, the dual mode carriage system may latch the operating mode for each store until a power cycle occurs. In this way, the dual mode carriage system does not need to devote resources to repeatedly determining the operating mode of a store that has not changed.

At 630, the dual mode carriage system generates an inventory of the plurality of stores connected to the dual mode carriage system by communicating with each store based on the corresponding operating mode. In one example, the dual mode carriage system may include additional information about each store (e.g., type of store, model number of store, status of store, etc.) in the inventory of the stores attached to the dual mode carriage system. At 640, the dual mode carriage system reports the inventory to the aircraft platform connected to the dual mode carriage system.

In summary, the techniques presented herein enable a carriage system to carry stores that use different interface formats (e.g., MIL-STD-1760 and AS5725) by repurposing a predetermined set of connection pins from one interface standard to carry information for the other interface standard.

It is to be understood that the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A method comprising:
    detecting a store attached to a dual mode carriage system on an aircraft platform;
    determining whether a first interlock signal formatted according to a first interface format is present for the store, wherein if the first interlock signal is present, then a store interface of the store is determined to be the first interface format;
    responsive to a determination that the first interlock signal is not present for the store, determining whether a second interlock signal formatted according to a second interface format is present on a predetermined set of connection pins for data communication in the first interface format, wherein if the second interlock signal is present, then the store interface of the store is determined to be the second interface format; and
    reporting the store interface of the store to the aircraft platform.

2. The method of claim 1, wherein the first interface format is a MIL-STD-1760 format, and wherein the second interface format is an AS5725 format.

3. The method of claim 2, wherein the predetermined set of connection pins comprises a set of address pins for data communication in the MIL-STD-1760 format.

4. The method of claim 1, further comprising communicating with the store via a data bus defined by the second interface format via another predetermined set of connection pins of the first interface format.

5. The method of claim 4, wherein the second interlock signal formatted according to the second interface format and the data bus defined by the second interface format are communicated over a set of address pins for data communication in the first interface format.

6. The method of claim 4, wherein the first interface format is a MIL-STD-1760 format, and wherein a set of address pins for data communication in the MIL-STD-1760 format includes the predetermined set of connection pins for the second interlock signal.

7. The method of claim 6, wherein the second interface format is an AS5725 format, and wherein the set of address pins for data communication in the MIL-STD-1760 format includes the another predetermined set of connection pins for the data bus defined by the AS5725 format.

8. An apparatus comprising:
    a memory to store computer executable instructions;
    a carriage station interface to communicate with an aircraft platform;

a plurality of carriage store station interfaces to communicate with a corresponding plurality of stores; and a processor coupled to the memory, the carriage station interface and the plurality of carriage store station interfaces, the processor configured to:

detect a store attached to one of the plurality of carriage store station interfaces on the aircraft platform;

determine whether a first interlock signal formatted according to a first interface format is present for the store, wherein if the first interlock signal is present, then a store interface of the store is determined to be the first interface format;

responsive to a determination that the first interlock signal is not present for the store, determine whether a second interlock signal formatted according to a second interface format is present on a predetermined set of connection pins for data communication in the first interface format, wherein if the second interlock signal is present, then the store interface of the store is determined to be the second interface format; and report the store interface of the store to the aircraft platform via the carriage station interface.

9. The apparatus of claim 8, wherein the processor is configured to determine whether the first interface format is a MIL-STD-1760 format, and wherein the processor is configured to determine whether the second interface format is an AS5725 format.

10. The apparatus of claim 9, wherein the predetermined set of connection pins comprises a set of address pins for data communication in the MIL-STD-1760 format.

11. The apparatus of claim 8, wherein the processor is further configured to communicate with the store via a data bus defined by the second interface format via another predetermined set of connection pins of the first interface format.

12. The apparatus of claim 11, wherein processor is configured to communicate the second interlock signal formatted according to the second interface format and the data bus defined by the second interface format over a set of address pins for data communication in the first interface format.

13. The apparatus of claim 11, wherein the first interface format is a MIL-STD-1760 format, and wherein the processor is configured to communicate in the MIL-STD-1760 format using a set of address pins that includes the predetermined set of connection pins for the second interlock signal.

14. The apparatus of claim 13, wherein the second interface format is an AS5725 format, and wherein the set of address pins for data communication in the MIL-STD-1760 format includes the another predetermined set of connection pins for the data bus defined by the AS5725 format.

15. One or more non-transitory computer readable storage media encoded with software comprising computer executable instructions and, when the software is executed on a processor of a dual mode carriage system on an aircraft platform, operable to cause a processor to:

detect a store attached to the dual mode carriage system;

determine whether a first interlock signal formatted according to a first interface format is present for the store, wherein if the first interlock signal is present, then a store interface of the store is determined to be the first interface format;

responsive to a determination that the first interlock signal is not present for the store, determine whether a second interlock signal formatted according to a second interface format is present on a predetermined set of connection pins for data communication in the first interface format, wherein if the second interlock signal is present, then the store interface of the store is determined to be the second interface format; and report the store interface of the store to the aircraft platform.

16. The one or more non-transitory computer readable storage media of claim 15, wherein the software is further operable to cause the processor to determine whether the first interface format is a MIL-STD-1760 format, and to determine whether the second interface format is an AS5725 format.

17. The one or more non-transitory computer readable storage media of claim 16, wherein the predetermined set of connection pins comprises a set of address pins for data communication in the MIL-STD-1760 format.

18. The one or more non-transitory computer readable storage media of claim 15, wherein the software is further operable to cause the processor to communicate with the store via a data bus defined by the second interface format via another predetermined set of connection pins of the first interface format.

19. The one or more non-transitory computer readable storage media of claim 18, wherein the second interlock signal formatted according to the second interface format and the data bus defined by the second interface format are communicated over a set of address pins for data communication in the first interface format.

20. The one or more non-transitory computer readable storage media of claim 18, wherein the first interface format is a MIL-STD-1760 format, and wherein a set of address pins for data communication in the MIL-STD-1760 format includes the predetermined set of connection pins for the second interlock signal.

* * * * *